United States Patent [19]
Vogel

[11] Patent Number: 5,356,243
[45] Date of Patent: Oct. 18, 1994

[54] PIVOTING TUBE SECTION FOR PNEUMATIC TRANSPORT TUBE SYSTEM

[75] Inventor: Victor J. Vogel, Oak Ridge, N.J.

[73] Assignee: Mosler, Inc., Wayne, N.J.

[21] Appl. No.: 51,077

[22] Filed: Apr. 21, 1993

[51] Int. Cl.5 .............................................. B65G 51/32
[52] U.S. Cl. ........................................ 406/74; 406/112
[58] Field of Search ...................... 406/13, 26, 28, 31, 406/73, 74, 83, 110, 111, 112, 115, 164, 179

[56] References Cited

U.S. PATENT DOCUMENTS

| | | | |
|---|---|---|---|
| 735,861 | 8/1903 | Davis | 406/21 |
| 1,819,307 | 8/1931 | Stoetzel | 406/74 |
| 3,976,264 | 8/1976 | Ekama et al. | 406/112 |
| 3,985,316 | 10/1976 | Weissmuller | 406/110 |
| 3,998,405 | 12/1976 | Carlier | 406/112 |
| 4,032,082 | 6/1977 | Weissmuller | 406/112 |
| 4,343,574 | 8/1982 | Anders | 406/13 |
| 4,352,603 | 10/1982 | Anders | 406/27 |
| 4,820,086 | 4/1989 | Kieronski | 406/112 |

FOREIGN PATENT DOCUMENTS

| | | | |
|---|---|---|---|
| 2652276 | 5/1978 | Fed. Rep. of Germany | 406/112 |
| 3203333 | 8/1983 | Fed. Rep. of Germany | 406/110 |
| 2247402 | 5/1975 | France | 406/110 |

Primary Examiner—David M. Mitchell
Assistant Examiner—Andrew C. Pike
Attorney, Agent, or Firm—Wood, Herron & Evans

[57] ABSTRACT

A downsend terminal for a pneumatic transport tube system has a pivoting tube section pivoting about an upper horizontal axis to move the pivoting tube section between a first vertical position and a second oblique position. When at the oblique second position, the carrier is dropped out of the pivoting tube section onto a carrier support holding the carrier in a generally vertical position for access to the user. When the user completes the transaction, the terminal pulls the carrier vertically back into the pivoting tube section. If the carrier is overloaded, there is insufficient force to lift it off of the carrier support, and therefore an overloaded carrier is prohibited from entering the transport tube system. In addition, the construction prevents debris and other material from entering the transport tube system.

11 Claims, 3 Drawing Sheets

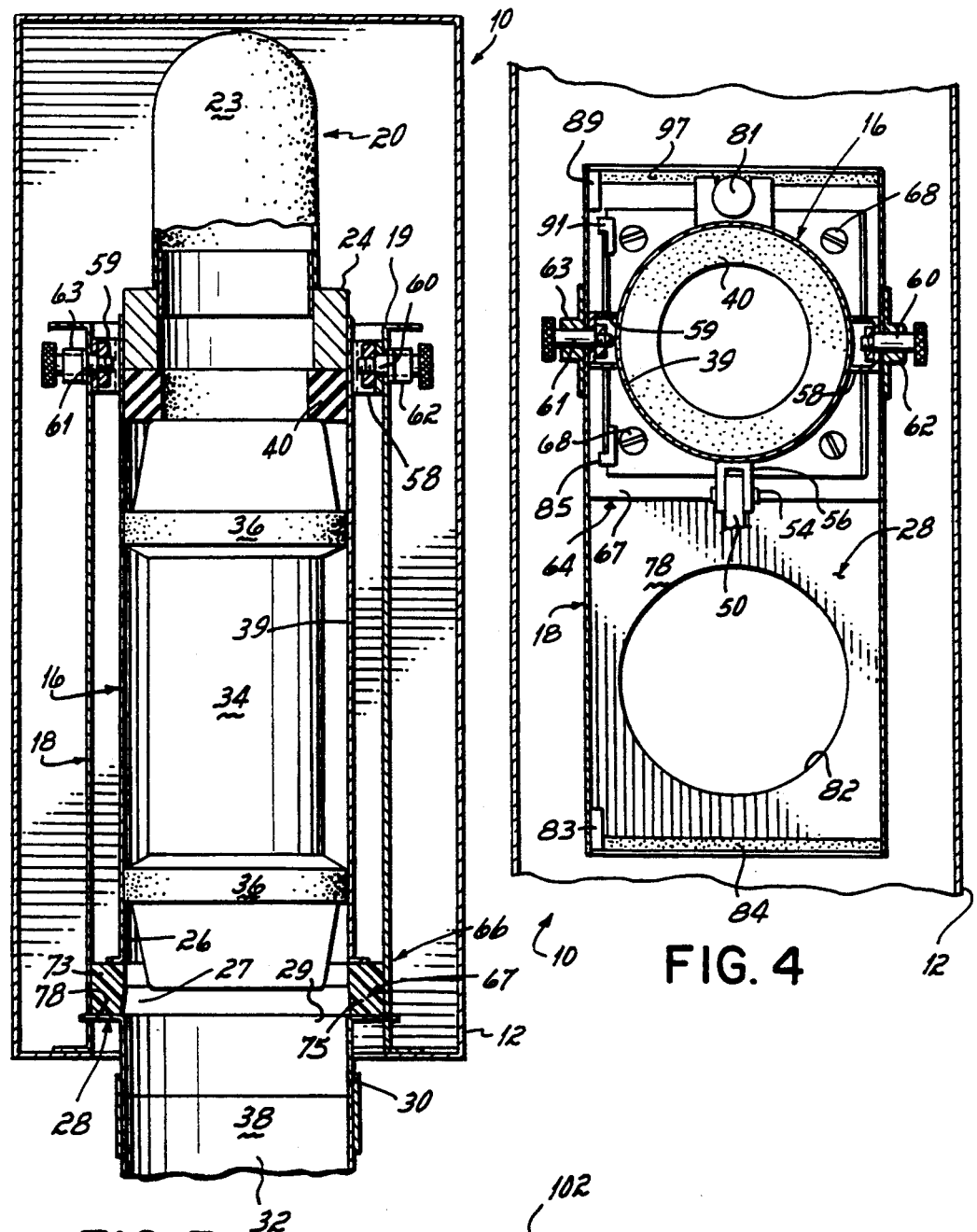
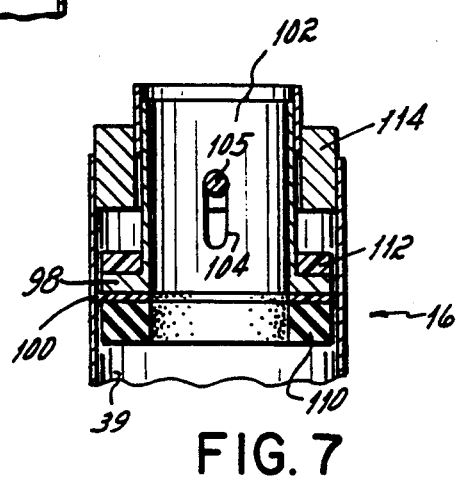
FIG. 3
FIG. 4
FIG. 7

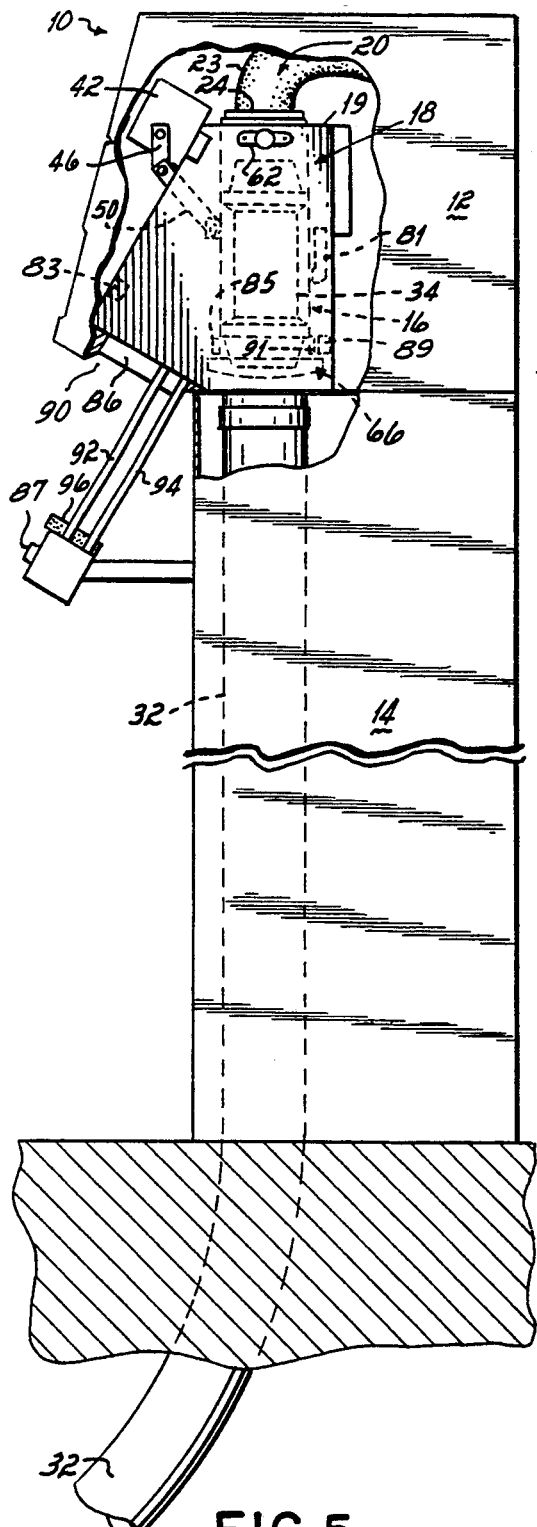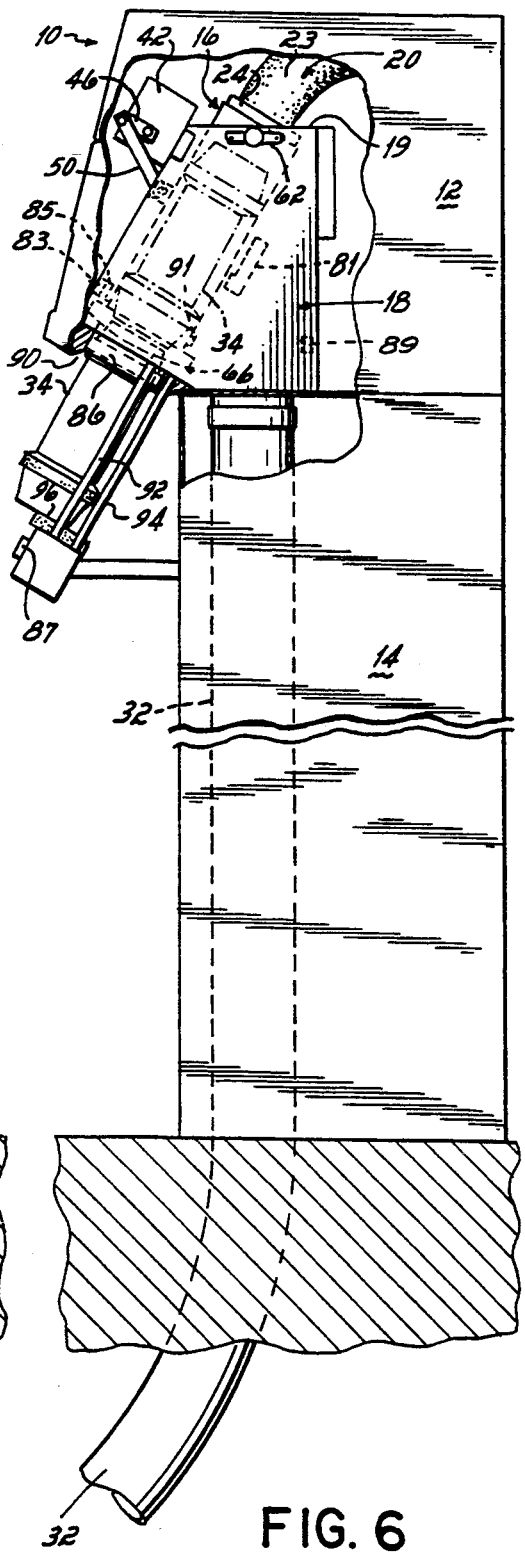

PIVOTING TUBE SECTION FOR PNEUMATIC TRANSPORT TUBE SYSTEM

BACKGROUND OF THE INVENTION

1. Field of the Invention

The present invention relates generally to the area of fluid current conveyors, and more particularly, to vertical tube section pivoting about an upper axis for use with a downsend pneumatic transport tube system.

2. Description of the Related Art

Pneumatic transport tube systems typically transport a carrier through a transport tube between two terminals. The carrier is moved by creating pneumatic pressure differentials within the transport tube with respect to the ends of the carrier. Pneumatic transport tube systems are often utilized by banks. A teller terminal, located in the bank, is connected by a pneumatic transport tube to a customer terminal located outside the bank such that a customer may use the customer terminal and is accessible to a user from a vehicle. Typically, the carrier in such systems is cylindrical and removable from the transport tube at the customer and teller terminals. The transport tube connecting the teller and customer terminals may be installed either overhead or underground. If an underground transport tube is utilized, the carrier moves up when it is received in the terminal and moves down when it is sent from the terminal. Consequently, a terminal for use with an underground transport tube system may also be referred to as an up-receive/down-send terminal or simply a downsend terminal.

The force available to move the carrier through the transport tube between the customer and the teller terminals is determined by the pneumatic pressure differential developed across the carrier. The maximum pressure differential is a design parameter and is determined by the size of the blowers and motors, etc. Consequently, every pneumatic transport tube system has a maximum pressure differential that may be applied across the carrier, and that maximum pressure differential determines the maximum load carrying capacity of the carrier.

With prior downsend terminals, the carrier is received in the terminal and moved to an exchange station at which point the carrier is out of the transport tube and within reach of the user. After finishing the transaction, the user typically inserts the carrier directly into a vertical section of the transport tube. The user may fill the carrier with a load that exceeds the maximum load carrying capacity of the carrier. However, there is no way to measure the load prior to the user inserting the carrier in the vertical tube section of the terminal. Consequently, if a carrier is overloaded, the carrier will drop to the bottom of the vertical tube section of the terminal and stop. The pneumatic forces developed in the transport tube will be insufficient to move the carrier through the transport tube. Therefore, the transport tube system is out of service until the overloaded carrier is manually removed. Downsend terminals, to which the user has direct access to the transport tube, have other disadvantages. For example, debris or other materials may be intentionally or inadvertently put into the vertical tube section.

Several downsend terminal constructions are known which do not provide the user of a customer terminal direct access to the vertical transport tube section. For example, in U.S. Pat. No. 3,976,264, a vertical tube section within the customer terminal pivots 90° about a horizontal axis at the upper end of the tube section thereby moving the tube section from a vertical position to a horizontal position. The advantage of that construction is that the carrier may be moved between the vertical and horizontal orientations without requiring a 90° elbow transport tube section, consequently a smaller terminal may be utilized. In another downsend terminal design disclosed in U.S. Pat. No. 3,985,316, after being received within the terminal, the carrier is deposited on a pallet which moves in a generally horizontal direction outward from the terminal toward the user. During the transaction, the user removes the carrier and then places it back on the pallet. The pallet then retracts back into the terminal, and the carrier is transported through the tube.

While those designs limit direct access of the user to the vertical tube section, those designs have the disadvantage of permitting an overloaded carrier to enter the vertical section of the transport tube system. Further, with those designs, debris and foreign matter may be pulled or carried to the top of a vertical tube section.

SUMMARY OF THE INVENTION

To overcome the disadvantage associated with prior downsend terminal designs, the present invention provides a vertical transport tube section which pivots about an upper horizontal axis to move the carrier between the vertical send/receive position and an oblique but generally vertical presentation position.

According to the principles of the present invention and in accordance with the described embodiments, a terminal is connected to a transport tube for moving a removable carrier vertically upward into the terminal and vertically downward out of the terminal. The terminal includes a pivoting tube section which has its upper end pivotally mounted to a tube support. The pivoting tube section has an open lower end for receiving the carrier and pivots between a vertical first position and an oblique generally vertical second position. When at the first position, the pivoting tube section has an upper end connected to a pneumatic supply for creating a pressure differential across the carrier to hold the carrier against the upper end of the tube section. When the pivoting tube section is at the second position, the pressure differential is released; and the carrier drops from the pivoting tube section onto a support stop. When resting on the support stop, the carrier is in a presentation position accessible to a user. The carrier is removed from the station by the user who loads or unloads material to or from the carrier. The user then places the carrier back on the presentation station by inserting one end of the carrier into the open lower end of the pivoting tube section and placing the other end of the carrier on the support stop. Upon depressing a send switch, the pressure differential is again applied to the carrier pulling it back to the upper end of the pivoting tube section. The pivoting tube section then pivots from the oblique generally vertical second position back to the first vertical position. The pressure differential is reversed, and the carrier is transported through the transport tube to another terminal.

The construction of the present invention has the advantage of prohibiting an overloaded carrier from entering the transport tube system. If the carrier is overloaded by the user, the pressure differential applied across the carrier will not be capable of lifting the carrier from the support stop back into the pivoting tube section. Further, the construction prohibits debris or foreign matter from inadvertently entering the system.

These and other objects and advantages of the present invention will become more readily apparent during the following detailed description in conjunction with the drawings herein.

BRIEF DESCRIPTION OF THE DRAWINGS

FIG. 3 is a cross-sectional view of the pivoting tube section taken along line 3—3 of FIG. 1.

FIG. 4 is a top cross sectional view of the pivoting tube section taken along line 4—4 of FIG. 1.

FIG. 5 illustrates a side view of the terminal with the pivoting tube section at a vertical position and the carrier shown in phantom within the pivoting tube section.

FIG. 6 illustrates a side view of the terminal with the pivoting tube section at a second oblique position. The carrier is shown at the presentation station and is also shown in phantom within the pivoting tube section.

FIG. 7 is a side view of a mechanism at the top of the pivoting tube section for decelerating the vertically upward motion of the carrier in the pivoting tube section.

DETAILED DESCRIPTION OF THE INVENTION

Figures 1, 2:
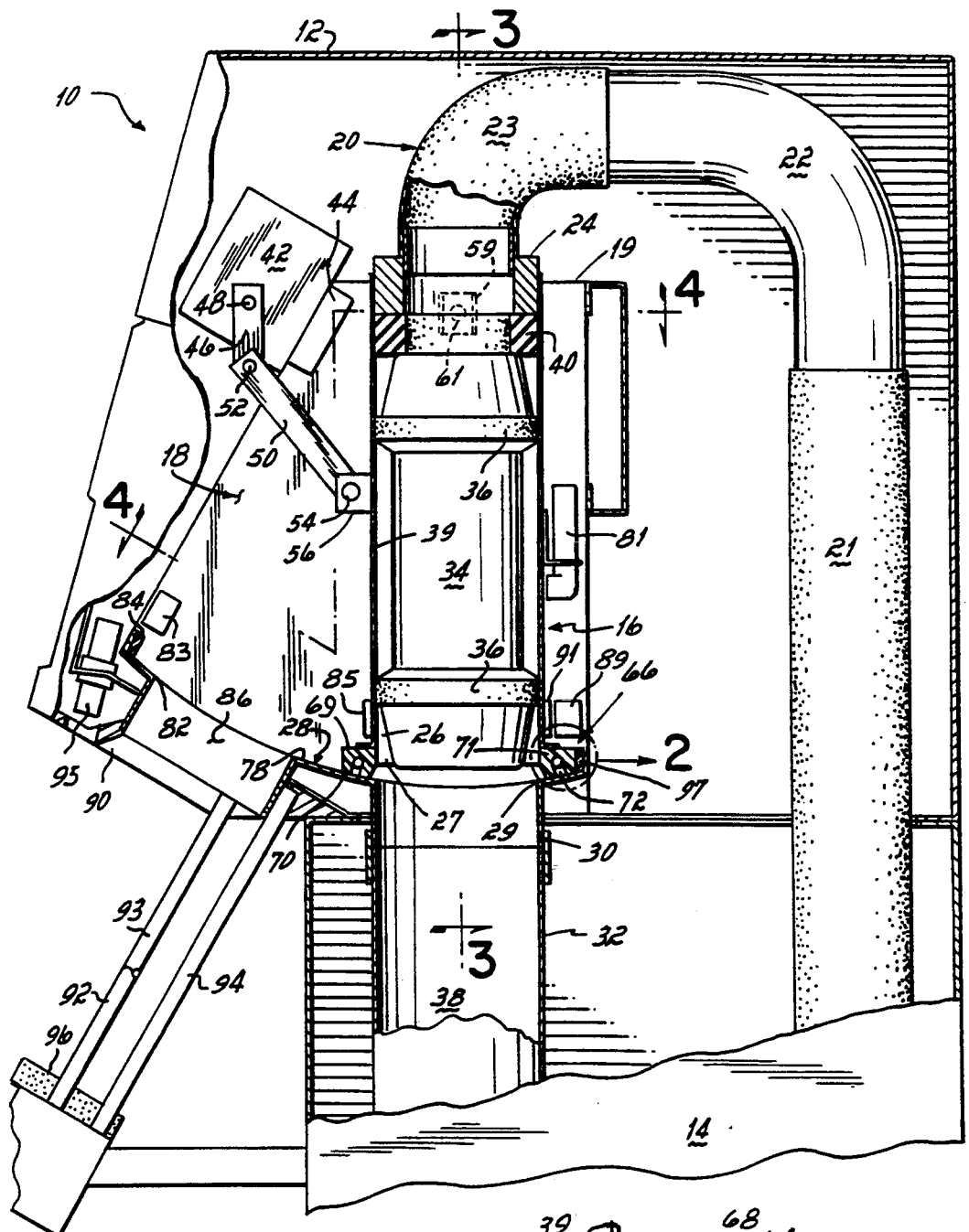
FIG. 1 is a cross-sectional view of the terminal illustrating the pivoting tube section in the vertical position.
FIG. 2 is an enlarged view of the encircled area 2 of FIG. 1.

FIG. 1 illustrate the general construction and operation of the downsend terminal 10 of the present invention. The terminal 10 has an outer housing 12 connected to a base 14. Within the terminal 10, a pivoting tube section 16 is located within and is pivotally connected to a tube support 18. The tube support 18 is mounted within the housing 12 and has an upper opening on an upper horizontal surface 19 at an upper end of the tube support 18 through which an air supply tube 20 passes and is connected to the upper end 24 of the pivoting tube section 16. The air supply tube 20 has a lower flexible pipe 21 connected to a blower (not shown), a rigid 90° elbow 22, and an upper flexible pipe 23 connected to the pivoting tube section 16. The pivoting tube section 16 has an opening 27 on its lower end 26. When the pivoting tube section 16 is in its vertical first position, the opening 27 on the lower end 26 of the tube section mates with an identical opening 29 on the lower plate 28 of the tube support 18. Contiguous with the opening 29 is a transport tube sleeve 30 adapted to receive transport tube 32.

A carrier 34 slides within the transport tube 32 and pivoting tube section 16. The carrier 34 has annular seals 36 in contact with the internal cylindrical surfaces 38 and 39 of the transport tube 32 and pivoting tube section 16, respectively. The annular seals 36 permit a pneumatic pressure differential to be applied across the carrier 34 thereby creating forces on the ends of the carrier which move the carrier in one direction or the other through the transport tube. For example, if a positive pressure is supplied by the air supply tube 20, a force will be applied to the upper end 24 of tube section 16 and onto the top of the carrier 34 which is effective to move the carrier in a vertically downward direction within the transport tube 32. Alternatively, if a negative pressure, or vacuum, is applied by the air supply tube 20, forces will be created on the carrier 34 which are effective to move the carrier in a vertically upward direction within the vertical transport tube 32. Such a negative pressure is effective to hold the carrier 34 against arrival pad 40 attached to the upper end 24 of the pivoting tube section 16.

An electric motor 42 is connected to a mounting bracket 44 which is rigidly attached to the tube support 18. An actuator arm 46 has one end tightly connected to a drive shaft 48 of the motor 42. The other end of the actuator arm 46 is pivotally connected to one end of an actuator link 50 by a pivot pin 52. The other end of the actuator link 50 is pivotally connected with a pivot pin 54 to a yoke 56 rigidly attached to the pivoting tube section 16. Referring to FIGS. 3 and 4, the pivoting tube section 16 has opposed pivot brackets 58, 59 near its upper end 24 which are connected by pivot pins 60, 61 to mating pivot brackets 62, 63 adjacent the upper end of the tube support 18. The pivot pins 60, 61 define a horizontal pivot axis about which the pivoting tube section rotates.

As shown in FIGS. 1, 2, and 4, a base plate 64 is located at the lower end of the pivoting tube section 16. A seal assembly 66 is mounted to the base plate 64 by screws 68 or other fasteners. The seal assembly 66 has an injection molded base 67 with four sides 69, 71, 73, 75 surrounding the opening 27 of the pivoting tube section 16, and the molded base 67 is made of high density polyethylene or comparable material such as nylon or "DELRIN®" low coefficient friction plastic material available from DuPont. A bottom surface 70 of the base 67 has a curvature which mates with the curvature of the upper surface 78 of the lower plate 28 of tube support 18. The lower plate 28 has an arcuate shape with a radius equal to the pivot radius defined by the distance from the pivot pins 60, 61 to the lower surface 70 of the pivoting tube section 16. On two sides 69, 71 of the lower surface 70 are two lateral grooves 72. Within each groove is seal 74 comprised of a square made from a "DELRIN®" plastic material and rod having a lower surface 76 in sealing engagement with the upper surface 78 of the lower plate 28 of the tube support 18. The seals 74 are slidingly engaged into the lateral grooves 72 against resilient rubber cords 80. The resilient rubber cords 80 apply a biasing force to hold the lower surfaces 76 of seals 74 in sealing contact with the upper surface 78 of the lower plate 28.

In operation, referring to FIG. 5, when the pivoting tube section is in a vertical first position, a negative air pressure differential is applied by the air supply tube 20 across the carrier 34. That pressure differential pulls the carrier 34 through the transport tube 32 and vertically upward through opening 29 of tube support 18 and opening 27 of the pivoting tube section 16 until the upper end 24 of the carrier 34 contacts the arrival pad 40, as shown by dotted lines in FIG. 5. The presence of the carrier 34 in the pivoting tube section 16 is detected by the photodetector 81. The negative pressure differential from the air supply tube 20 holds the carrier against the arrival pad 40 in the pivoting tube section 16. In response to the photodetector 81 detecting the presence of the carrier 34 in the pivoting tube section 16, the motor 42 is energized to rotate the drive shaft 48 in a clockwise rotation as viewed in FIGS. 5 and 6. The clockwise rotation of the drive shaft 48 is effective to cause the pivoting tube section 16 to pivot within the tube support 18 about the pivot pins 60, 61 until the opening 27 in the lower end 26 of the pivoting tube section 16 is in alignment with an opening 82 (FIG. 1) of the lower plate 28 of the tube support 18. The pivoting motion continues until the side of the seal base 67 contacts a stop 84 mounted on the sidewall of the tube support 18, thereby placing the pivoting tube section in a second position oblique to the vertical first position. The stop 84 may be a piece or strip of any energy absorbing material such as neoprene or "EAR ®" high impact, energy absorbing material available from EAR Corp. of Indianapolis, Ind. The electric stall motor 42 stalls and holds the pivoting tube support 16 in that position which is shown in phantom FIG. 6.

When the magnetic proximity sensor 83 detects the presence of the magnetic proximity actuator 85, the operation of the blowers is stopped, thereby removing the pressure differential form the carrier 34. With no pressure differential across the carrier 34, the force of gravity pulls the carrier 34 from the pivoting tube section 16 in a generally downward direction through opening 27 of pivoting tube section 16 through an opening 82 of the bottom plate 28, through a sleeve 86 secured to the bottom plate 28, and through an opening 90 of the housing 12 and into sliding engagement with guide rods 92, 93, 94, which guide the carrier into engagement with support stop 96. When the carrier has come to rest on the support stop 96, as shown in FIG. 6, the upper end of the carrier is still located within the sleeve 86 of the tube support 18. With the carrier positioned against the stop 96, the carrier 34 is in a presentation position in which its longitudinal axis is oblique to a vertical direction; and the user may easily remove the carrier from the sleeve 86.

When the user has completed the transaction by removing material from or loading material into the carrier, the user inserts one end of the carrier 34 through opening 90 and into the sleeve 86 of the tube support 18 and places the other end of the carrier onto the support stop 96. If photosensor 95 (FIG. 1) operating through a hole in the housing 12 detects the presence of the user's hand or another object in the proximity of the carrier 34 when the carrier is resting on the stop 96 (FIG. 6), the send switch 87 is disabled. If the photosensor 95 does not detect any objects in the proximity of the carrier 34, when user activates a send push button switch 87, in a manner well known, a negative pressure differential, or vacuum, is applied via air supply tube 20, across the carrier 16. That pressure differential is effective to pull the carrier 34 in a generally upward direction through opening 90 of housing 12, through opening 82 of bottom plate 28, and then through opening 27 back into the pivoting tube section 16. The carrier 34 comes to a stop up against the arrival pads 40. The position of the carrier 34 in the pivoting tube section 16, as shown in phantom in FIG. 6, is sensed by photodetector switch 81; and thereafter, the direction of rotation of the motor 42 is reversed. The counterclockwise rotation of the drive shaft 48 is effective to move the pivoting tube section back to its first vertical position which is located by the side of the seal base 67 contacting a stop 97 identical to the stop 84. When the magnetic proximity sensor 89 senses the presence of the magnetic proximity actuator 91, the pressure differential across the carrier 34 is reversed thereby moving the carrier 34 vertically downward through opening 27 of pivoting tube section 16, through opening 29 of tube support 18 into the transport tube 34, and to another terminal (not shown) connected to the other end of the transport tube.

When the carrier 34 is in the position shown in FIG. 5, the above described construction and operation are effective to prohibit an overloaded carrier from entering the transport tube system. When the user activates the send switch 87, the magnitude of the pressure differential across the carrier 34 is limited to a force that will lift the carrier with its maximum payload. Consequently, if a carrier is overloaded, that condition is sensed because the pressure differential is insufficient to pull the overloaded carrier into the pivoting tube section. For the most accurate control, the rods 92, 93, 94 and support stop 96 are oriented to support the carrier 34 in a position oblique to the vertical and in a generally vertical position such that the pressure differential is lifting against a first force component created by substantially the full weight of the carrier against gravity. In the illustrated embodiment, the included angle between the vertical first position and the oblique second position is preferably 30°. The exact value of the included angle is a matter of design choice and will largely be determined by user convenience and accessibility when the carrier is resting on the stop 96. However, there is a practical range for the included angle. The minimum included angle between the oblique second position and the vertical first position is the minimum angular displacement that will permit the carrier to move past the vertical tube section without interference. As the included angle is made larger, a second force component resulting from the coefficient of friction between the carrier 34 and the members against which it slides, for example, guides 92, 93, 94 and the internal surface 39 of the pivoting tube section becomes larger. The second force component is a variable component. For example, the coefficient of friction may change depending on whether the sliding surfaces are hot or cold, or wet or dry. Therefore, as the included angle is made larger, the magnitude of the second force component relative to the first force component becomes larger and it is more difficult to reliably detect an overloaded carrier.

In addition, the above construction makes it almost impossible for debris or other material to be intentionally or inadvertently put into the transport tube system. It is virtually impossible for debris to inadvertently enter the transport tube system. Further, debris intentionally thrown into the pivoting transport tube when in the oblique position will not lodge therein and fall out from the force of gravity.

While the present invention has been set forth by the description of the embodiments in considerable detail, it is not intended to restrict or in any way limit the claims to such detail. Additional advantages and modifications will readily appear to those who are skilled in the art. For example, the magnetic proximity switches may be replaced by other techniques for detecting the presence of the pivoting tube section at the first and second positions. When the photodetector switch 81 detects that the carrier is in the pivoting tube section, a timer may be started at the same time that clockwise rotation of the motor 42 is initiated. The length of the timer is set to expire to give the motor sufficient time to move the pivoting tube section to the second position. Therefore, when the timer expires, the pivoting tube section is in the second position; and the timer expiration may be used to remove the pressure differential from the carrier. Similarly, a timer may be used to determine when to apply a positive pressure differential across the carrier after the motor 42 is activated to move the pivoting tube section from the second to the first positions.

Instead of using the brackets 58, 59, 62, 63 and shoulder screws 60, 61 to provide a pivot joint, an alternative bearing arrangement may be used. The brackets may be replaced by bearing plates having "OILITE ®" sintered bronze bushing bearings secured therein. Instead of the two shoulder screws, two pins are used. Each pin extends from the outer surface of the pivoting tube section, through the bushing in the plate connected to the pivoting tube section, and through the bushing in the plate connected to the tube support. Cap plates are mounted on the outside of the bearing plates mounted on the tube support to hold the pins in place.

In addition, instead of allowing the carrier to drop out of the pivoting tube section onto the carrier support, a small pressure differential may be applied across the carrier to push the carrier out of the pivoting tube section onto the carrier support.

Further, when the send switch 87 is activated, it is a matter of design choice whether to apply the maximum pressure differential across the carrier necessary to lift the carrier with a maximum payload. If the maximum pressure differential is used, the carrier enters the pivoting tube section at a high velocity. Stopping the tube at the top of the pivoting tube section may result in an undesirable noise. Therefore, to decelerate the carrier and cushion its stop, the energy absorber illustrated in FIG. 7 may be used. Referring to FIG. 7, the upper end 24 of the pivoting tube section 16 contains a circular steel plate 98 having a diameter a little less than the diameter of the internal cylindrical surface 38 of the pivoting tube section 16. The plate 98 has an annular disk 100, preferably made of nylon, which is bonded to the lower surface of the plate 98. The disk 100 slides on the internal cylindrical surface 38 to guide the plate 98. Welded to the top side of the plate 98 is a tube 102 with elongated slots 104. A pin 105, having each end fixed to pivoting tube section 16, extends diametrically across the pivoting tube section 16 and through the slots 104 of tube 102. The pin 105 is press fit into the holes (not shown) of the tube section 16 thereby securing them in place and permitting the plate 98 to move vertically within the pivoting tube section 16 an amount equal to the length of the slots 104. A silicon arrival pad 110 is bonded to the bottom surface of the disk 100 and pads 112 are mounted on the top surface of the plate 98. The pads 112 are made from "PORON ®" urethane material available from Rogers Corporation of East Woodstock, Conn. As the carrier moves vertically upward through the pivoting tube section, it strikes the arrival pads 110 which absorb some of the kinetic energy of the carrier. The kinetic energy remaining in the carrier applies a vertically upward force against the bottom surface of the plate 98 lifting the plate 98 in a vertically upward direction thereby consuming more of the kinetic energy in the carrier. As the plate 98 moves up, the pads 112 contact annular ring 114 which brings the plate and the carrier to a stop. The air pressure in the air supply tube 19 holds the carrier and plate in that position during the pivoting motion of the pivoting tube section 16.

Alternatively, to reduce the kinetic energy in the carrier, a lesser pressure differential may be applied for a predetermined period of time. If, after the lesser pressure differential is applied, the presence of the carrier is not sensed by photodetector 81, thereby indicating that the lesser pressure differential is insufficient to lift the carrier from the presentation station, the maximum pressure differential may then be applied. The switching between the lesser and the maximum pressure differentials may be done automatically in response to the output of the photodetector switch 81 or a timer, or the switching may be initiated by the teller who is observing the operation of the system. The invention in its broadest aspects is therefore not limited to the specific details shown and described. Accordingly, departures may be made from such details without departing from the spirit or scope of the general inventive concept.

What is claimed is:

1. A terminal connected to a transport tube, said transport tube transporting a carrier into and out of the terminal, the terminal comprising:

a tube section support having a lower surface,
   a first opening located on said lower surface and adapted to be connected to the transport tube, and
   a second opening on said lower surface adjacent said first opening;

a carrier support connected to said tube section support proximate said second opening and adapted to support the carrier in a position oblique to a vertical; and a pivoting tube section located within said tube section support and adapted to receive the carrier, said pivoting tube section having
   an upper end pivotally connected to an upper end of said tube section support,
   an open lower end, said pivoting tube section pivoting with respect to a pivot axis between a first position aligning said open lower end with said first opening and the transport tube and a second position aligning said open lower end with said second opening and said carrier support, and
   means connected to said pivoting tube section for sealing said lower end of said pivoting tube section against said lower surface of said tube section support.

2. The terminal of claim 1 wherein air having a pressure differential relative to atmospheric pressure is connected to the upper end of the pivoting tube section and wherein further said means for sealing is in continuous sliding contact with said lower surface of said tube section support to minimize the exchange of air between said pivoting tube section and said tube section support.

3. The terminal of claim 2 wherein said means for sealing comprises sealing members in sliding contact with said lower surface of said tube section support for creating a seal between said open lower end of said pivoting tube section and said lower surface of said tube section support.

4. The terminal of claim 2 wherein said means for sealing comprises:

first sealing members extending along two first sides of said open lower end of said pivoting tube section, said sealing members extending parallel to said pivot axis and in sliding contact with said lower surface of said tube section support; and
   second sealing members extending along two second sides of the pivoting tube section perpendicular to the two first sides for further sealing the pivoting tube section with the tube section support.

5. The terminal of claim 4 wherein said pivoting tube section further comprises:

a pair of grooves located on a bottom surface of each of said first sealing members and extending parallel to said two first sides of said pivoting tube section;
a resilient material located in each of said grooves; and
a sealing material located in each of said grooves and having one side in contact with said resilient material and an opposing side in contact with said lower surface of said tube section support, 6. The terminal of claim 1 wherein said pivoting tube section further comprises a shock absorbing member located at said upper end of said pivoting tube section for receiving and stopping the carrier at said upper end of said pivoting tube section.

7. The terminal of claim 1 wherein said first position is a vertical position and said second position is a position oblique to said vertical position.

8. A terminal Connected to a transport tube, said transport tube transporting a carrier into and out of the terminal by air having a pressure differential relative to atmospheric pressure, the terminal comprising:
a tube section support adapted to be mounted in the terminal and having
an upper end adapted to be connected to the air,
a lower surface,
a first opening on said lower surface adapted to be connected to the transport tube, and
a second opening on said lower surface adjacent said first opening;
a carrier support connected to said tube section support proximate said second opening and adapted to support the carrier in a position oblique to a vertical;
a pivoting tube section located within the tube section support and adapted to receive the carrier, said pivoting tube section having
an upper end pivotally connected to said upper end of said tube section support,
an open lower end,
said pivoting tube section selectively moving between a first position aligning said open lower end with said first opening of said tube section support and a second position aligning said open lower end with said second opening of said tube section support; and
means for sealing said lower end of said pivoting tube section within said tube section support, wherein said lower surface of said tube section support is in continuous sliding sealing contact with said open lower end of said pivoting tube section.

9. A method for operating a downsend terminal connected to an underground pneumatic transport tube, said pneumatic transport tube transporting a carrier into and out of the downsend terminal in response to the application of a pressure differential across the carrier, the terminal including a pivoting tube section having an open lower end, said pivoting tube section pivoting about a pivot axis at an upper end to selectively position the lower end adjacent the pneumatic tube section and a presentation station, the method comprising the steps of:
pivoting the pivoting tube section to a vertical first position;
applying a first pressure differential across the carrier to move the carrier in a vertically upward direction from the pneumatic transport tube into the pivoting tube section and to maintain the carrier in the pivoting tube section;
pivoting the pivoting tube section from said vertical first position to a second position oblique to said vertical first position;
removing said first pressure differential from said carrier thereby allowing the carrier to drop in a generally downward direction from the pivoting tube section to the presentation station;
applying said first pressure differential across the carrier to move the carrier in a generally upward direction from the presentation station into the pivoting tube section and to maintain the carrier in the pivoting tube section;
pivoting the pivoting tube section from said second position to said vertical first position; and
applying a second pressure differential across the carrier to move the carrier in a vertically downward direction from the pivoting tube section and into pneumatic transport tube.

10. The method of claim 9 wherein the first pressure differential is produced by connecting a source of air at the upper end of said pivoting tube section, and said first pressure differential is produced by said source of air having a pressure less than atmospheric pressure.

11. The method of claim 10 wherein said second pressure differential is produced by said source of air having a pressure greater than atmospheric pressure.

* * * * *